United States Patent [19]

Harada et al.

[11] 4,095,096
[45] June 13, 1978

[54] CODE DISCRIMINATOR

[75] Inventors: Shuzi Harada; Tetsuo Yamaguchi, both of Yokohama, Japan

[73] Assignee: Matsushita Electric Industrial Co., Ltd., Kadoma, Japan

[21] Appl. No.: 716,711

[22] Filed: Aug. 23, 1976

[30] Foreign Application Priority Data

Sep. 2, 1975 Japan .............................. 50-106740

[51] Int. Cl.² .......................... G06K 7/14; G06K 19/06
[52] U.S. Cl. ....................................... 235/463; 235/494
[58] Field of Search ................. 235/61.11 E, 61.11 D; 340/146.3 Z; 250/555, 566, 568, 569

[56] References Cited

U.S. PATENT DOCUMENTS

| | | | |
|---|---|---|---|
| 3,838,251 | 9/1974 | Herrin | 235/61.11 E |
| 3,886,521 | 5/1975 | Dobras | 235/61.11 E |
| 3,906,202 | 9/1975 | Meyer | 235/61.11 E |
| 3,916,154 | 10/1975 | Hare et al. | 235/61.11 E |
| 3,959,625 | 5/1976 | Kashio | 235/61.11 E |
| 4,012,716 | 3/1977 | Herrin | 235/61.11 E |

*Primary Examiner*—Daryl W. Cook
*Attorney, Agent, or Firm*—Stevens, Davis, Miller & Mosher

[57] ABSTRACT

The universal product code consisting of black bars and white spaces carrying information is discriminated by counting the occurrence period of electric signals corresponding to the guard pattern and averaging the count obtained thereby to provide a width information of the basic module, discriminating the first character by sampling the code in stop-start synchronization based on the width information, counting the occurrence period of electric signals corresponding to the (n-1)th character to provide another width information of the basic module from the count obtained thereby, and discriminating the n-th character by sampling the code in stop-start synchronization based on the basic module. Therefore, a high performance code discriminator can be achieved by a simple structure.

5 Claims, 14 Drawing Figures

| DECIMAL NUMBER | LEFT SIDE (ODD PARITY) | RIGHT SIDE (EVEN PARITY) |
|---|---|---|
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

1: BLACK    0: WHITE

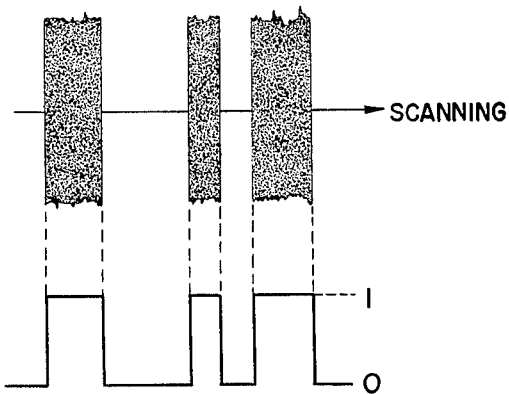
FIG. 4a
FIG. 4b
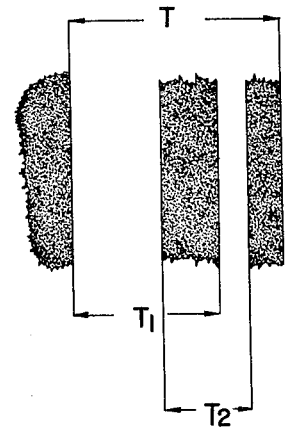
FIG. 5
IN THE CASE OF $\frac{Ti}{T} \leq \frac{2.5}{7}$, $Ti = 2$
IN THE CASE OF $\frac{2.5}{7} < \frac{Ti}{T} \leq \frac{3.5}{7}$, $Ti = 3$
IN THE CASE OF $\frac{3.5}{7} < \frac{Ti}{T} \leq \frac{4.5}{7}$, $Ti = 4$
IN THE CASE OF $\frac{4.5}{7} < \frac{Ti}{T}$, $Ti = 5$ (i=1.2)

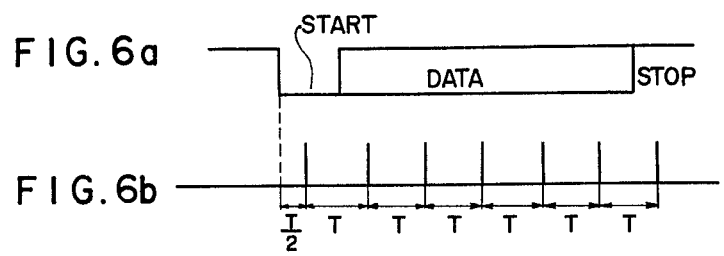
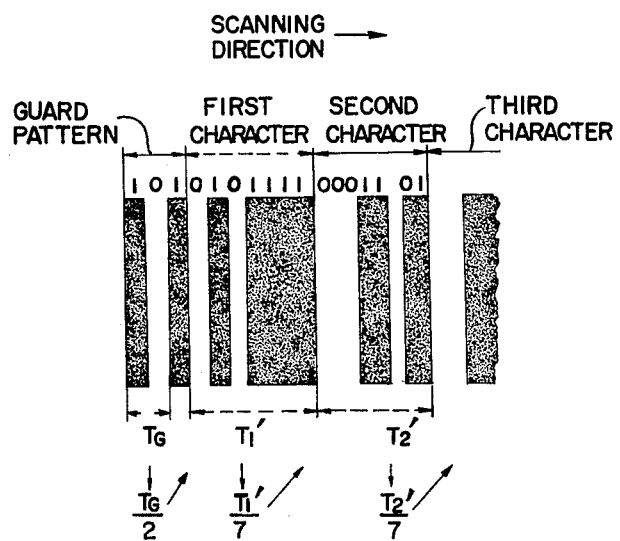

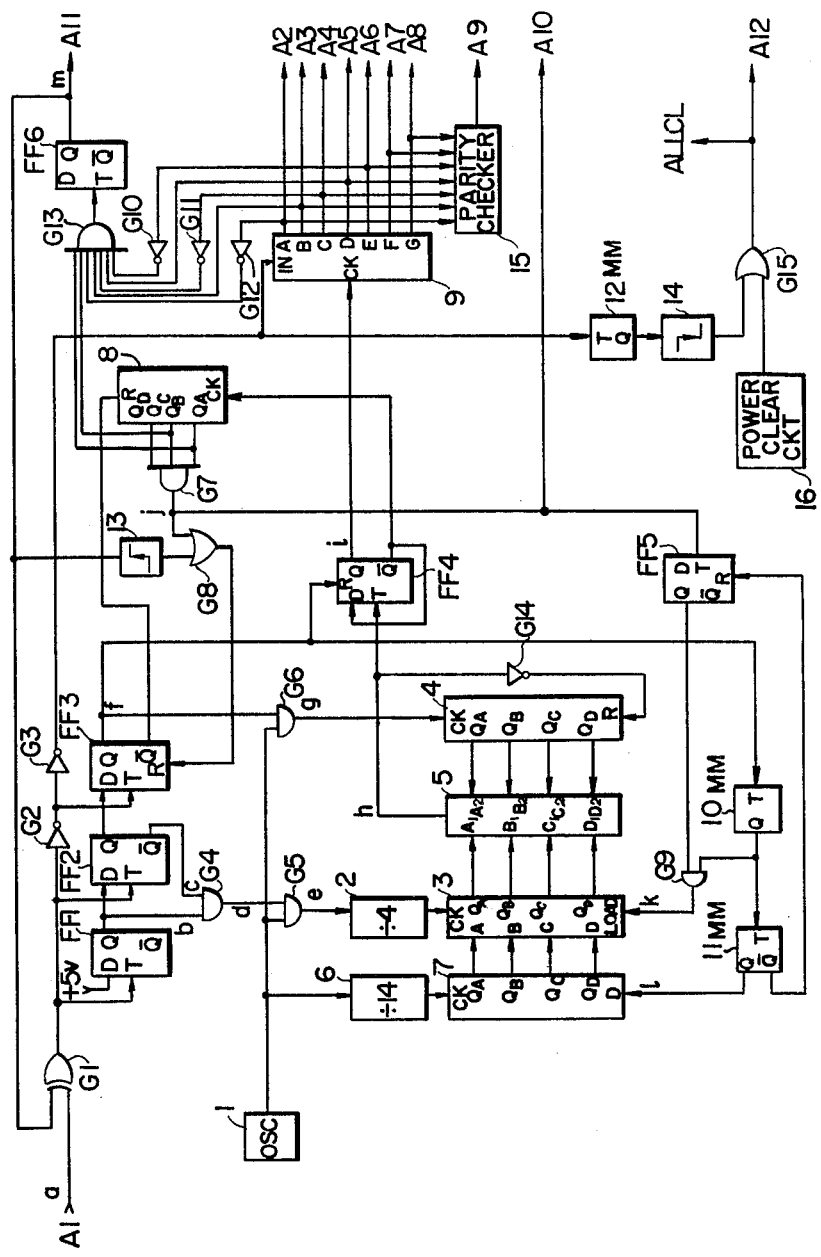
F I G. 8

CODE DISCRIMINATOR

This invention relates to a code discriminator for discriminating a code formed of bars and spaces.

Recently, point of sales systems have been rapidly introduced and spread in supermarkets, etc. for automatizing check-out processes to save man power and brain work, and for collecting and analyzing sales information to make use of this in management. According to this system, the required sales information is printed on a label in the so-called bar code consisting of bars and spaces. The coded information is read out optically to provide electrical input for a computer. Various styles have been proposed for the bar code.

This invention particularly relates to a discriminator for the universal product code (referred to as UPC, hereinbelow) which has been determined as the general symbol mark in the related fields in the United States and Canada by the united organization of the related fields including the General American Glossary Producers Association, General American Food Chain Association, General American Supermarket Association, etc. in 1973.

Hereinbelow, description will be made referring to the accompanying drawings, in which FIG. 1 is an illustration of the UPC standard symbol;

FIGS. 4a and 4b are illustrations showing a bar pattern and the transformed binary electric signal;

FIG. 5 is an illustration of a bar code for explaining the conventional discrimination system;

FIGS. 6a and 6b are waveform diagrams showing the principles of start-stop synchronization;

FIG. 7 is an illustration for explaining the principles of the discrimination system according to this invention;

FIG. 8 is a block diagram of a discriminator circuit according to an embodiment of this invention;

Figure 1:
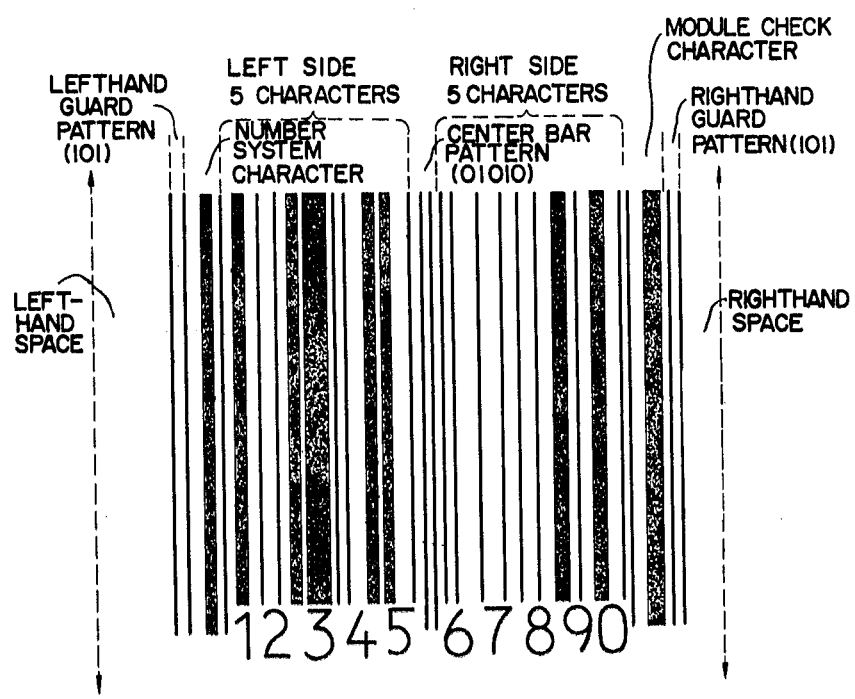

First, the UPC will be briefly. The UPC standard symbol consists of twelve characters. The whole symbol has a structure as shown in FIG. 1. Among the twelve characters, two characters are the industry code and the check character, the remaining ten characters are the main code for discriminating the goods. With respect to these ten characters, a readable number according to the OCR-B fount is added as shown in FIG. 1. The basic properties of this standard symbol is as follows.

(a) There are a series of black-white bars (i.e., white spaces and black bars) and spaces on both sides.

(b) The shape of the main bar body is square.

(c) Each character is represented by two black bars and two white bars (or white spaces).

(d) Each character consists of seven elements showing data, each element being called a module.

(e) One module is black or white.

(f) Each bar is formed of one to four modules.

(g) Each character is independent from the others.

(h) The series of black-white bars is sandwiched between the right and left guard patterns and has a center bar pattern at the center.

(i) On each of both sides of the center bar pattern, six characters are disposed.

Figures 2, 3:
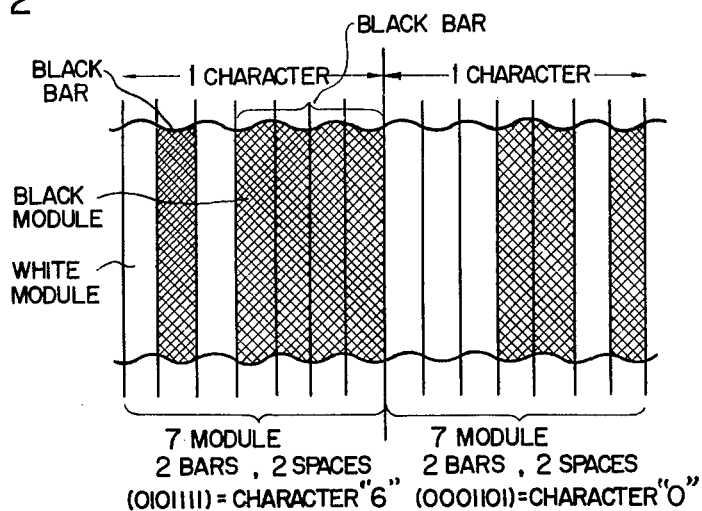
FIG. 2 is an illustration of the character structure of the UPC symbol.
FIG. 3 is a table showing the code structure of the UPC symbol character.

Each character has a code structure as shown in FIG. 2 with the properties as described above. Making "1" correspond to a black module and "0" to a white module, the lefthand character represents (010 1111) which denotes a character "6", and the righthand character represents (000 11 01) which denotes a character "0". The structure of character code is not uniquely determined by each character but is different according to which side of the center pattern the character is located on. It is so arranged that white and black are reversed as the character is located on the right or the left sides, and as a result an odd number of "1" 's is included in each character code on the lefthand side and an even number of "1"'s is included in each character code on the righthand side. This parity relation provides information for discriminating the read-out direction of the codes. The whole structures of the character codes are as shown in the table in FIG. 3.

Generally on decoding a bar coded symbol, the symbol is first scanned optically as shown in FIG. 4a, then transformed into an electric signal as shown in FIG. 4b and decoded. Here, the angle of scanning with respect to the bar code is not fixed due to the intrinsic characters of such system and also the scanning speed is not constant. Further, from the problem of printing, it is rare that the width of a white bar (white space) and a black bar is obtained to be of an ideal value. Usually, after the character code is converted into an electric signal, the width of a black bar is apt to become relatively larger than that of a white bar. Therefore, various contrivances are needed for decoding a bar coded symbol.

The discrimination method of IBM which first proposed the UPC symbol is as shown in FIG. 5. Namely, the total width of a character as well as widths $T_1$ and $T_2$ are counted and the module numbers corresponding to the module structure of such $T_1$ and $T_2$ is determined to discriminate the code from these values. The main advantage of this discrimination method lies in the elimination of the influence of the accuracy of printing. For example, although there is a tendency that black bars are generally printed wider than white bars (white spaces), the widths $T_1$ and $T_2$ change only in their relative locational relation and the widths themselves do not change much. On the other hand, this method is accompanied by inevitable problems in discriminating the width (period) of bars into four groups in the manner shown in FIG. 5. For example, in the equations shown in FIG. 5, when $T_1/T = 2.5/7$ and $T_2/T = 3.5/7$, etc., such value can be calculated in the equation but the discrimination is practically very difficult.

Further, only with such widths $T_1$ and $T_2$ discrimination between codes of "1" and "7", and codes of "2" and "8" cannot be made, thereby requiring other information. Yet further, the electronic circuit for performing the discrimination formulae of FIG. 4 should have an extremely complicated structure.

Therefore, an object of this invention is to provide a code discriminator utilizing the series data transformation method of the start-stop synchronication type which has been widely used in data communication, etc. and having an improved reading accuracy.

Another object of this invention is to provide a code discriminator comprising a read means of simple circuit structure which is free from the influence of printing accuracy.

According to an aspect of this invention, there is provided a code discriminator for discriminating a code consisting of modules of bars and spaces and including a guard pattern, characters and a center bar pattern, comprising: means for scanning the code and transforming the code into an electric signal; first discriminator means for counting the width of the basic module of the bar and the width of the basic module of the space in the guard pattern and averaging the widths, and for discriminating the first character following the guard pattern by sampling the first character in stop-start synchronization using said average as the standard width; and second discriminator means for counting the total width of the character before the character to be discriminated, dividing said total width by the number of modules constituting one character to provide another standard width, and for discriminator the character by sampling in start-stop synchronization.

FIGS. 6a and 6b illustrate the start-stop synchronization, in which figure (a) represents the data input signal read out from a symbol and figure (b) the timing of sampling pulses for the data input. Namely, when a fall of the data signal is detected, the timing for the sampling pulse commences and pulses for sampling the input data are generated on the basis of a predetermined bit period T to decode the code. This method is well known in the fields of data communication, etc.

As is apparent from the character structure of the UPC symbol shown in FIG. 3, each character of the symbol have the initial bit and the final bit which have each fixed values. Considering these bits as the start bit and the stop bit, the code has a most suitable structure for the start-stop synchronization. Therefore, discrimination by the start-stop synchronization can be easily made only when the standard bit interval is obtained.

This invention is one in which a discrimination is carried out by making use of the above principle. The standard bit interval is obtained from the reading of the guard pattern. Namely, in reading the guard pattern, $T_G$ which is the sum of the widths of black and white basic modules is counted and the standard bit interval is given by $T_G/2$. The unfavorable influence of the printing accuracy is minimized since an averaging of the widths of black and white basic modules is made. Here, scanning maybe also made on labels disposed on curved surfaces such as a can. In such cases, the scanning rate should change relatively and it is not appropriate to fix the standard bit interval at $T_G/2$ for the discrimination of the second and further characters. Thus, for discrimination of the second and further characters, a new standard bit interval is determined by the total length of the foregoing character divided by the number of modules constituting one character, i.e. seven, and the next discrimination of the start-top synchronization type is achieved thereon. For example, in FIG. 7, the second character is discriminated on the basis of $T_1'/7$ and the third character on the basis of $T_2'/7$. The lengths $T_G, T_1', T_2'$, etc. are influenced little by the printing accuracy. Further, since sampling of the data is achieved only at selected sampling times and no transient points of the data are used as the information, this sampling method has the feature of being free from the influence of the printing accuracy.

This invention is based on the above principles. FIG. 8 shows a discriminator circuit according to an embodiment of this invention. In the figure, a bar pattern signal formed of a converted binary electric signal is supplied to an input terminal $A_1$, and is converted into parallel signals which are supplied to output terminals $A_2$ to $A_8$. Letters $A_9$, $A_{10}$, $A_{11}$ and $A_{12}$ denote a parity output terminal, a strobe signal output terminal, an output terminal for the center bar pattern detection signal, and an output terminal for the all clear signal respectively. Letters $G_1$ to $G_{15}$ denote inverters or gates; $G_1$ an EXCLUSIVE OR gate, $G_2$, $G_3$, $G_{10}$, $G_{11}$, $G_{12}$ and $G_{14}$ inverters, $G_4, G_5$, $G_6$, $G_7$, $G_9$ and $G_{13}$ AND gates, and $G_8$ and $G_{15}$ OR gates. Letters $FF_1$ to $FF_6$ denote flip-flops of the D type. Block 1 denotes an oscillator circuit of a standard clock signal having a period sufficiently short compared to the time width of the basic module, 2 a quarter frequency divider (divided by 4), 3 a presettable binary counter, 4 a binary counter, 5 a comparator for comparing the content of the counter 3 with that of the counter 4, 6 a fourteenth frequency divider (divded by 14), 7 and 8 binary counters, 9 a shift register for series-parallel conversion of the input signal, 10, 11 and 12 monostable multivibrators, 13 and 14 edge pulse generators for detecting the rise and the fall of a pulse signal, respectively, 15 a parity checker, and 16 a power clear signal generator for generating a clear signal for the circuit at the time of switching-in the power.

Figure 9:
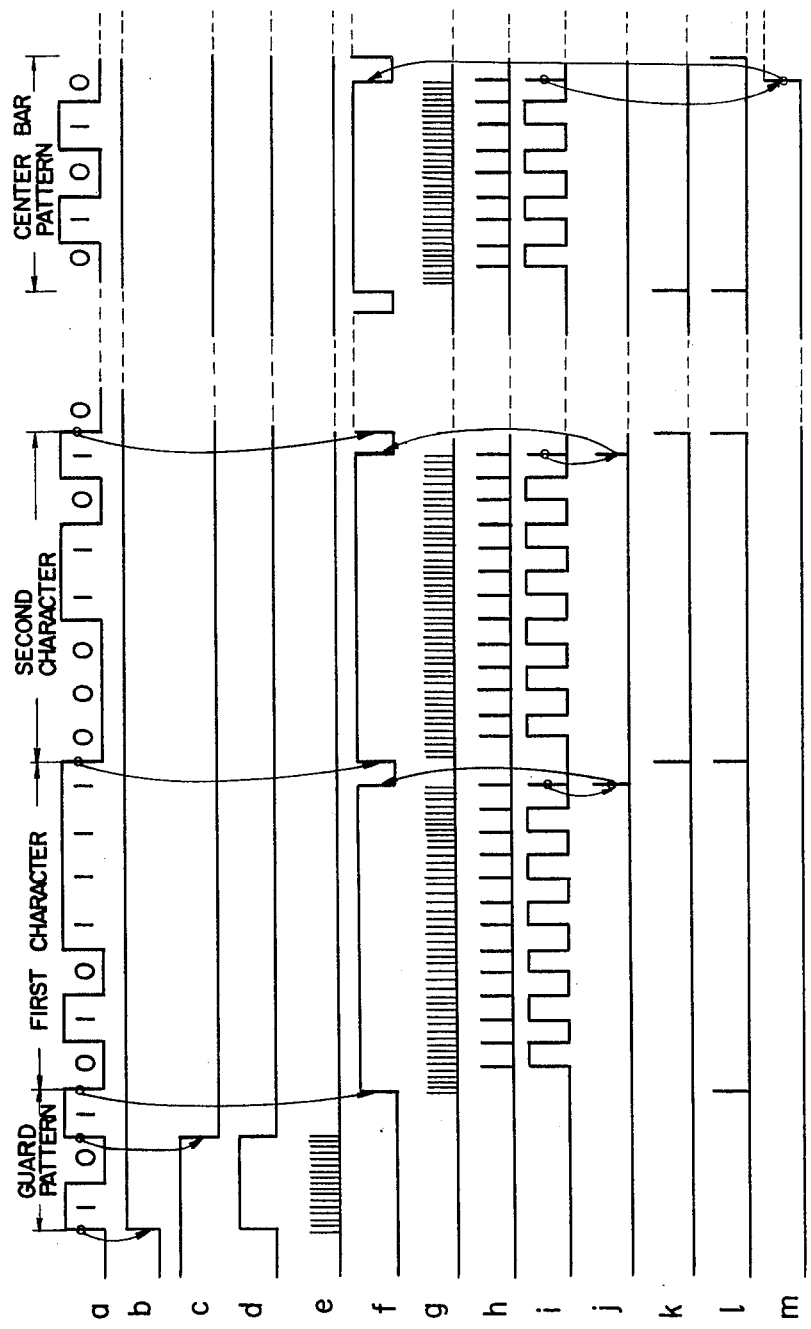
FIG. 9 shows signal waveforms at various portions of the circuit of FIG. 8.

The operation of the circuit of FIG. 8 will be described with reference to the time chart (waveforms $a$ to $m$) of FIG. 9 representing the waveforms at points $a$ to $m$ in the circuit of FIG. 8. When the power is switched in, a power clear signal is generated in the circuit 16 and is supplied to all the flip-flops and all the counters through the gate $G_{15}$ to perform the initial clear. The supply lines for this all clear signal are not shown in FIG. 8 for the sake of preventing complication. After the initial clear, the bar pattern signal $a$ converted into a binary electric signal is directed to the EXCLUSIVE OR gate $G_1$ through the input terminal $A_1$. The other input $m$ of the gate $G_1$ is initially at the low state and hence the bar pattern signal transmits the gate $G_1$ with the same polarity and is supplied to the flip-flops $FF_1$ and $FF_2$ which then generate signals $b$ and $c$. The gate $G_4$ generates the AND signal $d$ of these two inputs $b$ and $c$. The width $T_G$ of this AND signal $d$ is twice the basic module width. During the time in which the gate $G_5$ is opened by the signal $d$, the output of the standard clock oscillator circuit 1 is supplied through the quarter frequency divider 2 to the presettable binary counter 3 which counts the number of clock pulses and stores the count. The count corresponds to $T_G/4$, i.e. a half of the basic module width $T_G/2$. When the scanning passes over the guard pattern and reaches the first character, the flip-flop $FF_3$ is set to change the output signal $f$ at a high level. Then, the gate $G_6$ is opened to supply the output of the standard clock oscillator 1 to the binary counter 4. The binary counter 4 starts the count. When the count of the binary counter 4 reaches $T_G/4$, i.e. coincides with the output of the presettable counter 3, the comparator 5 generates an output pulse $h$, which immediately resets the binary counter 4. Thus, the binary counter begins the count from the beginning again. In this way, the comparator 5 generates an output pulse $h$ at every time interval corresponding to a half of the basic module width $T_G/2$. The pulse train $h$ is supplied to the flip-flop $FF_4$ which serves as a half frequency divider. As a result, the output $i$ of the flip-flop $FF_4$ has a period equal to the basic module width and is supplied to the shift register 9 for series-parallel conversion of the input signal as the sampling signal for the bar pattern input signal to achieve the sampling of the input. The binary counter 8 receives and counts the number of pulses in the sampling signal and provides an output pulse j from the gate $G_7$ at every seventh count. The pulse j is supplied through the gate $G_8$ to the flip-flop $FF_3$ to reset it assuming that the sampling of the first character is terminated. Then, the flip-flop $FF_3$ stops supplying the basic clock to the binary counter 4 thrugh the gate $G_6$ and also resets the flip-flop $FF_4$ and the binary counter 8.

When the scanning passes over the first character and reaches the second character, the output of the binary counter 7 is read into the presettable binary counter 3 prior to the beginning of the count of the binary counter 4, as the load input signal k of the presettable binary counter 3 is generated at each character termination as shown in FIG. 9. The signal K is a load signal for reading the contents of the counter 7 into the presettable counter 3. On the basis of this newly preset value, a sampling operation similar to the previous one is repeated. Here, since the binary counter 7 is continuously supplied with a clock formed by dividing the basic clock by fourteen in the fourteenth frequency divider 6, and the reset signal l thereof has a timing as shown in FIG. 9, the count of the binary counter 7 becomes one fourteenth of the whole time width $T_1'$ of the first character when the count is read into the presettable binary counter 3. The time width $T_1'/7$ corresponds to the basic module width and one half thereof is used as a new sampling standard.

In this way, the sampling standard is renewed at every character as shown in FIG. 7 to continue the discrimination of the bar pattern signal. However, there exists a center bar pattern at the midst of a UPC symbol. Since the center bar pattern consists of five modules, it cannot be discriminated in the similar way as that for discriminating the characters. Thus, as shown in FIG. 8, the gate $G_{13}$ is provided to detect the center bar pattern (01010). When a center bar pattern is detected, the flip-flop $FF_6$ is set by the detection output from the gate $G_{13}$ is set by the detection output from the gate $G_{13}$ and generates an output signal m the rising edge of which is detected by the circuit 13 to generate an edge pulse. This edge pulse closes the gate $G_8$ and sets the flip-flop $FF_3$ which then waits the arrival of a new character. On the other hand, since the output signal m of the flip-flop $FF_6$ becomes of high level, the EXCLUSIVE OR gate $G_1$ serves as a reversing gate for the bar pattern input signal. Thus, the bar pattern input signal reverses the polarity after passing through the gate $G_1$. This reversion is to deal with the reversion of black and white in the bar pattern of the UPC symbol on the two sides of the center bar pattern. Namely, when the scanning crosses over the center bar pattern, the bar pattern input signal is reversed so that the same discrimination of the bar pattern as that in the former half before crossing over the center bar may be carried out.

The circuit 15 checks the parity of the bar pattern signal converted into parallel signals. The output of the circuit 15 is supplied to the terminal $A_9$. The output signal j of the gate $G_7$ is supplied to the terminal $A_{10}$ for taking timing for supplying the signals at the terminals $A_1$ to $A_9$ to an external buffer. The re-triggerable monostable multivibrator 12 having a time width than several times of the basic module width, and prevents malfunction due to noise as well as checking the pulse width of the bar pattern input signal. In the normal discrimination of the bar pattern, it is re-triggered repeatedly and the output thereof is at a high level. When, e.g., the scanning is deviated from the bar code and the bar pattern input ceases, the output of the multivibrator 12 fall down and is detected by the fall detection circuit 14 the output of which clears the circuits automatically. As this clear signal is supplied to the terminal $A_{12}$ in common with the power clear signal, an external means can check whether the discrimination is being achieved correctly.

Figure 10A:
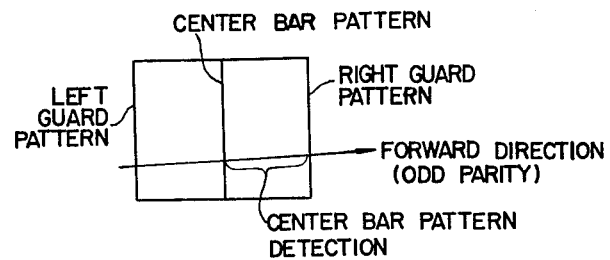
FIGS. 10a, 10b and 10c are diagrams for explaining various types of scanning.
Figure 10B:
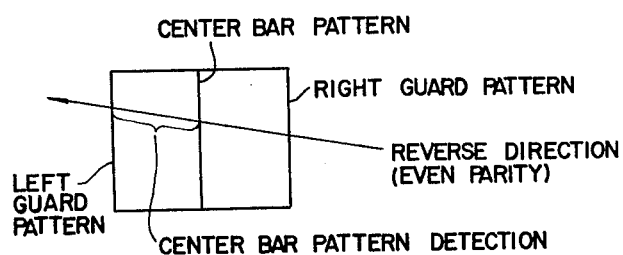
Figure 10C:
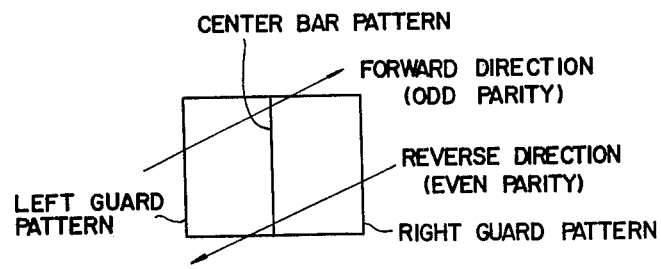

The output signal m of the flip-flop $FF_6$ is also supplied to the terminal $A_{11}$ as the center bar pattern detection signal, and the reason for this will be described below. Generally, a reader device for the UPC symbol is expected to read the informaton by the scanning not only in directions shown in FIGS. 10a and 10b but also in such directions as that of FIG. 10c. Therefore, the righthand field and the lefthand field of the UPC symbol should be regarded as independent of each other.

The center bar pattern is provided for this purpose originally. Here, the discriminator circuit should send out a signal representing on which field the scanning is being made to an external device. This can hardly be achieved only by the parity information, but this function can be perfectly achieved by providing the center bar pattern detection signal as shown in FIG. 8.

In the above circuit, only the pulse width check was shown as a check for errors, but the read in accuracy may be further increased by adding a pattern check, start-stop bit check, a check with a check character, etc. Further, although 4-bit structures were used for the counters, comparator, etc. for generating the standard sampling pulses, it is obvious that the accuracy in reading may be further increased by further increasing the oscillation frequency of the standard clock signal and increasing the bit number of such counters and comparator, for example, to 6 to 8.

What we claim is:

1. A code discriminator for discriminating code consisting of modules of bars and spaces and including guard patterns, characters and a center bar pattern, comprising:
    means for scanning the code and transforming the code into an electric signal;
    first discriminator means for counting the width of the basic module of the bar and the width of the basic module of the space in the guard pattern and averaging the widths, and for discriminating the first character following the guard pattern by sampling the first character in start-stop synchronization using said average as a standard width; and
    second discriminator means for counting the total width of the character before the character to be discriminated, dividing said total width by the number of modules constituting one character to provide another standard width, and for discriminating the character by sampling in start-stop synchronization.

2. A code discriminator according to claim 1 further comprising:
    means for detecting the center bar pattern provided in said code; and
    means for reversing the polarity of said electric signal to be inputted into said first and second discriminator means by the use of the output of said detecting means.

3. A code discriminator according to claim 1, wherein said first discriminator means comprises an oscillator for generating a clock signal of a predetermined frequency, a first gate opening the gate only during the period in which the electric signal corresponding to said guard pattern is generated, a first frequency divider applied with the output of said oscillator through said first gate and dividing the frequency of the oscillator output into one forth thereof, a presettable first counter for counting the output of said first frequency divider, a second gate opening the gate only during the period in which the electric signal corresponding to said first character is generated, a second counter applied with the output of said oscillator through said first gate, a comparator for detecting the coincidence of the counts of said first and second counters, means for resetting said second counter by the output of said comparator, a flip-flop driven by the output of said comparator, and means for sampling said electric signal by the use of the output of said flip-flop.

4. A code discriminator according to claim 3, wherein said first discriminator means further comprises a third counter for detecting that seven output pulses of said flip-flop are produced, for controlling said second gate with the output of said third counter.

5. A code discriminator according to claim 3, wherein said second discriminator means comprises a second frequency divider for dividing the frequency of the output of said oscillator into one fourteenth thereof, a fourth counter for counting the output of said second frequency divider during a period corresponding to the $(n-1)$th character, and means for presetting the counted value of said fourth counter into said first counter, where n is a positive integer.

* * * * *